324-77
SEARCH ROOM

July 25, 1961 H. HURVITZ 2,994,036

FREQUENCY SCANNING SPECTRUM ANALYZERS

Filed April 29, 1955

INVENTOR

Hyman Hurvitz

United States Patent Office 2,994,036

Patented July 25, 1961

2,994,036

FREQUENCY SCANNING SPECTRUM ANALYZERS

Hyman Hurvitz, 822 Warner Bldg., Washington, D.C.

Filed Apr. 29, 1955, Ser. No. 504,715
6 Claims. (Cl. 324—77)

The present invention relates generally to frequency scanning spectrum analyzers, and more particularly to frequency scanning spectrum analyzers employing electroluminescent indicators for visually indicating the frequency content of a scanned frequency band.

It is known in the prior art to apply a band of frequencies to the input of a frequency converter, or mixer, tuning the oscillator of the mixer or converter periodically in such manner that the frequencies of the original band of frequencies are sequentially converted to values within the pass band of an intermediate frequency amplifier connected to the output of the converter or mixer. The signals appearing in the intermediate frequency amplifier or filter cause deflection of the beam of a cathode ray beam oscilloscope in one coordinate direction, the beam being deflected in another coordinate direction in synchronism with the frequency scanning operation. Such systems present the requirement for a cathode ray tube indicator, including the necessary power supplies and the like, and for that reason such systems are relatively complex, bulky, and costly.

It is one feature of the present invention to replace the cathode ray tube indicator of the spectrum analyzers of the type above described by an electroluminescent plate, which is responsive to the intermediate frequency output of the intermediate frequency amplifier directly, and which requires no power supplies and no bulky and costly accessories, thereby reducing the cost, weight, and size of frequency scanning spectrum analyzers.

In accordance with one specific embodiment of the present invention, the visual display is produced on an electroluminescent plate by means of a rotating stylus or contact, which rotates in synchronism with a frequency scanning operation, maintaining electrical coupling at all times with an electroluminescent phosphor layer. Incidence of a signal in the intermediate frequency filter or amplifier accordingly produces a glow in the electroluminescent layer at positions about the circle described by the rotating stylus or contact which corresponds with frequencies of signals in the original band of frequencies.

In accordance with another embodiment and feature of the present invention a plurality of intermediate frequency amplifiers are connected in parallel, these consisting preferably of piezo-electric crystals. It is well known that the scanning rate which may be utilized in scanning a band of frequencies is directly related to the pass band of the intermediate frequency amplifier of the system, if the visual response is required to be of optimum resolution. For high Q intermediate frequency amplifiers or filter the scanning rate must be slow, and if a piezo-electric crystal is utilized as an intermediate frequency amplifier, giving consideration to the fact that such crystals have a Q or quality factor of the order of 10,000 or greater, the required scanning rate is extremely slow, but the resolution attainable by the system is extremely good. By utilizing a sufficient number of piezo-electric crystal I.F. channels in parallel, these being all tuned to different frequencies, and each actuating a different visual indicator, the rate of scan may be increased to any extent desired. By utilizing electroluminescent indicator plates as visual indicators, and further by utilizing piezo-electric crystals as intermediate frequency filters, provision of a large number of intermediate frequency amplifier filters does not lead to complicated and costly circuitry or structure.

In accordance with still a further feature of the present invention, the output signal derivable from an intermediate frequency filter of a frequency scanning spectrum analyzer is applied to a circular continuous electrode of an electroluminescent plate. Accordingly, receipt of any signal in the intermediate frequency filter results in production of a glow covering a complete circular path. This circular path is blocked visually except at one point thereof. Otherwise stated, the path is viewable through a small optical aperture. The aperture itself is rotated in synchronism with the scanning operation, so that the glow as viewed through the aperture is positioned in accordance with a frequency being received. If the frequency scanning operation is conducted at a sufficiently rapid rate the visual responses, which are in fact discontinuous, appear to the eye to be continuous.

In the last described embodiment of my invention, a plurality of electroluminescent circles may be utilized on a single electroluminescent plate, each of the circles being connected in series with a different intermediate frequency filter of the piezo-electric type. In this way an extremely long frequency scale may be produced on a single electroluminescent plate, the rate of scan may be made high, and the visual resolution provided by the spectrum analyzer system may be far greater than is possible with any currently available system, all simultaneously.

The equation connecting optimum resolution of a spectrum analyzer with scanning rate is $$R=1.5\sqrt{\frac{df}{dt}}$$

where R is the width in cycles per second of the response curve of the analyzer, at 3 db points down, when a single frequency is being displayed, and where the scanning rate in cycles per second per second $$\frac{df}{dt}$$

is selected as high as may be to provide the optimum response of the system. The scanning rate $$\frac{df}{dt}$$

is equal to $ws$, where $w$ is the total band scanned and $s$ the repetition rate of scanning. Hence $R=1.5\sqrt{WS}$. It follows that if the total band scanned is reduced by a factor of two, the resolution of the system may be decreased by a factor of $\sqrt{2}$, or for a given desired resolution and total extent of scanned band the rate of scan may be doubled. Further, if a scan rate is established, and a desired resolution, the total band scanned may be increased in proportion to the number of visual channels employed.

It is, accordingly, an object of the present invention to provide an improved frequency scanning spectrum analyzer.

It is another object of the invention to provide a superheterodyne frequency scanning spectrum analyzer having multiple spaced and simultaneously operative intermediate frequency amplifiers, each actuating separate visual indicator.

Another object of the invention resides in the provision of a novel visual indicator for spectrum analyzers.

A further object of the invention resides in the provision of a spectrum analyzer employing an electroluminescent plate visually to indicate simultaneously a plurality of frequency bands.

The above and still further features, objects and advantages of the present invention will become apparent upon consideration of the following detailed description of a specific embodiment of the invention, especiallv when taken in conjunction with the accompanying drawings, wherein.

Figure 1:
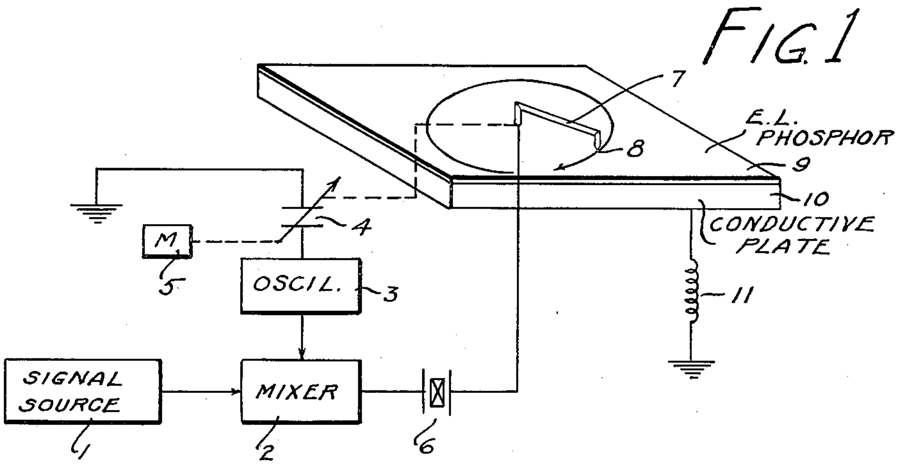
FIGURE 1 is a view in functional block diagram and perspective of a frequency scanning spectrum analyzer employing an electroluminescent plate as a visual indicator.

Proceeding now more particularly by reference to the accompanying drawings, FIGURE 1 illustrates a frequency scanning spectrum analyzer utilizing a mechanically rotating stylus in conjunction with an electroluminescent plate. The reference numeral 1 denotes a signal source, which may present a band of frequencies of any desired width and having any desired frequency values. More particularly, the signal source 1 may constitute the output of an intermediate frequency amplifier of a wide band receiver, or may constitute a sonic intercept device, or an antenna. Signals provided by the signal source 1, however derived, and whatever their values may be, are all simultaneously applied to the input of a mixer circuit 2, to which is also applied the output of an oscillator 3. The oscillator 3 is tunable by means of a variable condenser 4, and the latter is continually tuned by mechanical rotation caused by means of a motor 5. Accordingly, the frequency of the oscillator 3 is continually varying over a band for which the oscillator 3 is designed. At the output of the mixer 2 is provided an intermediate frequency filter in the form of a piezo-electric crystal 6.

While I have described and illustrated the intermediate filter 6 as consisting of a piezo-electric crystal 6, it will be apparent more complex circuits may be employed if desired, and that in fact the piezo-electric crystal 6 may be replaced by a conventional intermediate filter or amplifier, which may or may not utilize piezo-electric crystal elements. It is however advantageous to utilize a single piezo-electric crystal 6 as an intermediate frequency amplifier, because of the extreme simplicity and the extremely high Q thereby obtainable. The signal passing through the piezo-electric crystal 6 is applied to a rotating stylus 7, the point 8 of which bears on a layer of electroluminescent phosphor 9 supported by a conductive plate 10. The conductive plate 10 may be fabricated of transparent material if desired, such as conductive glass, and the glass itself may be, if desired, non-conductive but may contain a conductive layer immediately under the phosphor layer 9. Glass of this type is well known in the prior art, and one common type of such glass is sold under the trade name Nesa. Various forms of transparent conductive plates have been described in the patent to Mager, No. 2,624,857, and in that patent is further described the specific phosphor or phosphors which may be employed for the layer 9. However, a wide variety of electroluminescent phosphors is known, and any of these may be employed in the present invention, provided they are included in a suitable dielectric binder. The plate 10 is connected in series with a tuning coil 11 and thence to ground. The stylus 7 is mechanically coupled with the condenser 4, so that as the condenser 4 is rotated by the motor 5 the stylus 7 rotates in synchronism therewith, making preferably one complete revolution for each cycle of tuning of the oscillator 3 by the tuning condenser 4.

The area under the points 8 of the stylus 7, in conjunction with the underlying area of the conductive plate 10, and the intermediate layer of phosphor 9 embedded in a suitable dielectric medium, constitutes a condenser. This condenser in conjunction with the tuning coil 11 is arranged to be resonant to the same frequency as is the piezo-electric element 6. Accordingly, passage of a signal through the piezo-electric crystal 6 results in generation of a high voltage across the electroluminescent condenser, since the total voltage of the signal passed by the crystal 6 is multiplied by the Q factor of the voltage 11 in arriving at the voltage across the condenser. Of course, this assumes that the electroluminescent condenser itself has no losses, and that assumption has proven substantially correct at frequencies of the order of 10 mc./s. or less.

Describing now the operation of the system of FIGURE 1, the signals provided by the source 1 are converted in the mixer 2 in sequence to the frequencies which may be passed by the crystal 6, the conversion taking place in response to variation of frequency of the oscillator 3. As the oscillator 3 varies in frequency in such manner that the band of frequencies provided by the source 1 are converted in sequence to the frequency of the piezo-electric crystal, the stylus 7 is rotated so that each angular position thereof corresponds with the converted frequency. Upon passage by the crystal 6 of a converted frequency, the stylus 7 is energized, and accordingly the electroluminescent phosphor 9 glows adjacent the stylus point 8. The positions of these glows then represent the frequencies of signals in the received band, and the circular path traced out by the point 8 of the stylus 7 may be calibrated in terms of these frequencies. It will be clear that the rate of scan in cycles per second must be suitably proportioned to the total band covered, and to the pass band of the crystal 6. The total visual resolution obtainable is of course determined by the pass band of the crystal 6, and may be made extremely high. However, the total band scanned must be quite low, or the rate of scan must be made low, in order to permit time for build-up of optimum response in the crystal 6 during the scanning operation, in response to any signal contained in the original band. It follows that in the system of FIGURE 1, while high resolution is attainable, the cost of this high resolution is that either a small band of frequencies must be scanned, or that if a large band of frequencies is scanned, the scanning must take place at a low rate of scan, in cycles per second, per second. A further objection to the system of FIGURE 1 is the fact that a mechanical stylus is employed, which must be rotated, and which must maintain contact with the phosphor layer 9. The use of wiping contacts is generally undesirable.

Figures 2, 3:
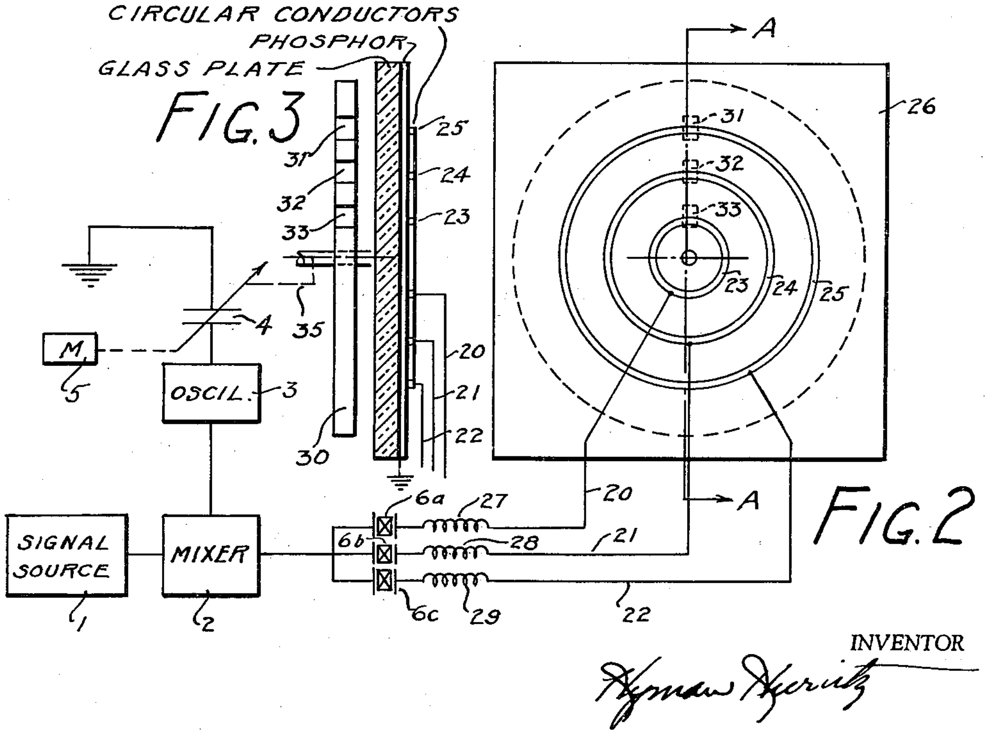
FIGURE 2 is a view in functional block diagram of circuitry, and in plan of a visual indicator, employing multiple path indications in a spectrum analyzer.
FIGURE 3 is a view in cross section of the indicator of FIGURE 2.

In the system of FIGURES 2 and 3, I have provided solutions to many of the problems raised in systems of the type illustrated in FIGURE 1. In the system of FIGURES 2 and 3, I have provided signal source 1, mixer 2, oscillator 3, tuning condenser 4, and tuning motor 5, which may duplicate the corresponding elements in FIGURE 1, if desired. The output of the mixer 2 is connected to a plurality of piezo-electric crystal filters *6a*, *6b*, *6c*, which are rather widely separated in frequency.

To provide a specific example, assume that the signal source 1 provides a band of frequencies extending from 7 to 10 mc. per second. Assume that the crystals *6a*, *6b*, *6c* have frequencies of 2, 3, and 4 mc. respectively. Assume further that the oscillator 3 tunes over the frequency band 5 to 6 mc. per second periodically. The effect is then the same as if the signal source 1 were divided into three discrete portions, one extending from 7 to 8 mc., another from 8 to 9 mc., and the other from 9 to 10 mc. Each of these portions would be converted by the oscillator 3 and the mixer 2 only to intermediate frequencies which may be passed respectively by the crystals *6a*, *6b*, *6c*. For example, as the oscillator 3 tunes over the frequency band 5 to 6 mc. per second any frequency occurring in the sub-band 7 to 8 mc. per second will be converted in sequence to the frequency 2 mc. per second which is passed by the filter *6a*, but never to the intermediate frequencies 3 or 4 mc. per second which are passed by the crystal filters *6a* and *6b*. On the other hand, simple calculations will show that the sub-bands 8 to 9 mc. per second will be handled exclusively by the crystal filter $6b$ tuned to the frequency 3 mc. per second, while the sub-band 9 to 10 mc. will be handled exclusively by the crystal filter $6c$, tuned to the frequency 4 mc. per second. There will be no interaction of responses, and accordingly the net effect of the system is that the scanning rate of the oscillator 3 may be increased, or its band width capability increased, because the total frequency band required to be scanned by the oscillator 3 has been decreased. Obviously, the expedient suggested may be extended to any number of piezo-electric crystal I.F. channels in parallel without departing from the spirit of the invention, and eventually a very high rate of scan may be accomplished, far higher than is possible in presently available systems, while retaining the resolution provided by virtue of the use of piezo-electric crystal intermediate frequency amplifiers.

The signals provided in the separate I.F. channel including the crystals $6a$, $6b$, $6c$ are led by separate leads 20, 21, 22 to separate circular electrodes 23, 24, 25 consisting of conductive layers coated or otherwise formed on electroluminescent dielectric plate 26. Each of the circular electrodes 23, 24, 25 presents definite electrical capacity to its I.F. channel by virtue of the fact that it is in conjunction with the underlying conductive plate 26 and is separated therefrom by an electroluminescent phosphor layer, embedded in a dielectric binder. The capacities of the condensers are tuned by means of tuning coils 27, 28, 29 connected in series therewith in the leads 20, 21, 22, so that the voltage available at any of the electrodes 23, 24, 25 is increased in accordance with the Q of its resonant circuit, excluding the Q of the crystals $6a$, $6b$, $6c$ from consideration.

It follows from the structure as described and illustrated, that passage of a signal through any one of the crystals $6a$, $6b$, $6c$ will result in illumination of a complete circular area on the plate 26 which subsists under that electrode 23, 24, 25 which is connected with the signal passing crystal. An opaque plate 30 is provided underlying the plate 26, the plate 30 having therein three apertures 31, 32, 33 which expose a small angular portion of the electrodes 23, 24, 25, respectively, the plate 30 visually blocking the remainder of the electrodes. Despite the fact that the electrodes 23, 24, 25 extend around an entire circle, and glow as a unit, only that portion of the electrode provides a visual indication which lies immediately under one of the apertures 31, 32, 33. The plate 30 is rotated in synchronism with tuning of the condenser 4 by means of a suitable mechanical connection 35, so that the portions of the electrodes 23, 24, 25 which are visually available correspond at all times with frequency of the oscillator 3. Thereby a frequency base line is established about the electrodes 23, 24, 25.

It will be observed that the total length of the frequency base line is equal to the sum of the lengths of the electrodes 23, 24, 25, each electrode being available for visual display of a portion only of the total signal band provided by the source 1, and specifically that portion of the band which may be converted to the frequency of an associated piezo-electric crystal, by virtue of scanning of the oscillator 3.

Accordingly, the system of FIGURES 2 and 3 provide the following advantages: There are no wiping contacts. By suitable subdivision of intermediate frequency amplifier responses, a wide band of frequencies may be scanned at a high rate of scan. The resolution of the system in terms of width of visual display provided by a single frequency in the signal source 1 may be as high as is permitted by the selectivity of the piezo-electric crystals $6a$, $6b$, $6c$. The rate of scan may be increased as desired by the simple expedient of adding circular electrodes 23, 24, 25, and corresponding piezo-electric crystals $6a$, $6b$, $6c$ and tuning coils 27, 28, 29.

While I have described and illustrated one specific embodiment of the present invention it will be clear that variations of the specific details of construction may be resorted to without departing from the true spirit of the invention as defined in the appended claims.

What I claim is:

1. A visual display spectrum analyzer comprising means for frequency scanning repetitively in equal time periods and in sequence the frequencies of a band of frequencies, means responsive to each frequency in said band of frequencies when attained by said means for scanning for exciting an electroluminescent display, said display including an extended pair of conductors having electroluminescent phosphor therebetween, an optical aperture physically movable over said display and rendering visible at any one time only a small portion of said display, and means synchronized with said means for frequency scanning for moving said optical aperture over said display.

2. A spectrum analyzer including a source of a band of frequencies, a frequency scanning frequency converter device for converting said frequencies to a band of intermediate frequencies, a plurality of parallel connected intermediate frequency filters coupled to said frequency scanning frequency converter device, said filters having frequency responses spaced at intervals within said band of intermediate frequencies, wherein said frequency scanning converter device includes means for scanning a band of frequencies equal in extent to one of said intervals, wherein is further provided a single visual indicator device for said band of frequencies, said single visual indicator device including a plurality of discrete indicating elements each responsive only to one of said filters and connected to be energized by the intermediate frequency output thereof.

3. A spectrum analyzer including a source of a band of frequencies, a frequency scanning frequency converter device for converting said frequencies to a band of intermediate frequencies, a plurality of parallel connected intermediate frequency filters coupled to said frequency scanning frequency converter device, said filters having frequency responses spaced at intervals within said band of intermediate frequencies, wherein said frequency scanning converter device includes means for scanning a band of frequencies equal in extent to one of said intervals, wherein is further provided a single visual indicator device for said band of frequencies, said single visual indicator device including a plurality of discrete indicating elements each responsive only to one of said filters and connected to be energized by the intermediate frequency output thereof, wherein each of said indicating elements includes an elongated pair of conductors having electroluminescent phosphor therebetween, and wherein is provided an optical aperture for each of said indicators providing visual access to a relative small portion of an indicator at any one time, and means for moving said apertures along said indicators in synchronism with said frequency scanning.

4. A system for indicating visually the frequency of signals occurring within a predetermined band, comprising a mixer, means for supplying said signals to said mixer, a source of local oscillations, means for injecting said local oscillations into said mixer, means for deriving predetermined conversion products of said signals and said local oscillations from said mixer comprising means for selecting a small portion of said predetermined conversion products, an indicator comprising at least one extended luminous indicator, means for igniting said at least one extended luminuous indicator over its entire length in response to the amplified conversion products, restricted optical aperture means movable along said strip to expose successive small portions thereof successively, means for periodically at equal time intervals varying the frequency of said local oscillation, and means for periodically moving said aperture means along the length of said strip in synchronism with the variations of frequency of said local oscillations, said means for selecting a small portion of said predetermined conversion products includes a plurality of parallel intermediate frequency filters of different center frequencies, and wherein said at least one extended luminous indicator is a corresponding plurality of extended electroluminescent strips each responsive to a different one of said intermediate frequency filters.

5. A visual indicator comprising a plurality of extended strips of electroluminescent material, separate circuits for transiently igniting each of said strips totally in accordance with a first periodic time schedule, and each independently of the other, means for viewing only a restricted element of each of said strips at any one instant of time, and means for varying the position of said restricted element over said strips in accordance with a further periodic time schedule synchronized with said first time schedule, wherein is provided plural synchronized frequency scanning means for exploring each one of a plurality of bands of frequencies simultaneously for the presence of signals at successive positions of said bands, means responsive to the finding of signals by said frequency scanning means in any one of said bands for supplying ignition signals to a predetermined one of said circuits.

6. A visual indicator comprising a plurality of concentric circular radially separated strips of electroluminescent material, separate circuit means for igniting each of said strips of electroluminescent material totally, a generally opaque plate rotatable on the axis of said strips and having aperture means for permitting visual observation of one small circumferential element of each of said strips at any instant of time, wherein is provided a plurality of separate mutually synchronized means for scanning a plurality of bands of frequencies in synchronism with rotation of said plate, said last means each including means for generating a signal in response to attainment of a signal in the course of said scanning, and means for supplying said signals each to only one of said separate circuit means.

References Cited in the file of this patent

UNITED STATES PATENTS

| | | |
|---|---|---|
| Re. 19,441 | Sparkes | Jan. 22, 1935 |
| 1,781,866 | Bahney | Nov. 18, 1930 |
| 1,814,399 | Meissner | July 14, 1931 |
| 1,964,776 | Zuschlag | July 3, 1934 |
| 2,403,983 | Koenig | July 16, 1946 |
| 2,514,619 | Anderson | July 11, 1950 |
| 2,530,693 | Green | Nov. 21, 1950 |
| 2,556,586 | Johnston | June 12, 1951 |
| 2,602,836 | Foster | July 8, 1952 |
| 2,624,857 | Mager | Jan. 6, 1953 |
| 2,632,036 | Hurvitz | Mar. 17, 1953 |
| 2,661,419 | Tongue | Dec. 1, 1953 |
| 2,698,915 | Piper | Jan. 4, 1955 |
| 2,764,736 | McLeish | Sept. 25, 1956 |
| 2,769,091 | Hansel | Oct. 30, 1956 |
| 2,782,366 | Wall | Feb. 19, 1957 |
| 2,796,584 | Hurvitz | June 18, 1957 |
| 2,810,883 | Carnine | Oct. 22, 1957 |